(12) United States Patent
Ofner

(10) Patent No.: US 11,975,636 B2
(45) Date of Patent: May 7, 2024

(54) VEHICLE SEAT BACKREST

(71) Applicant: FAURECIA Sièges d'Automobile, Nanterre (FR)

(72) Inventor: Roger Ofner, Paris (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 0 days.

(21) Appl. No.: 17/577,618

(22) Filed: Jan. 18, 2022

(65) Prior Publication Data

US 2022/0227266 A1 Jul. 21, 2022

(30) Foreign Application Priority Data

Jan. 19, 2021 (FR) ...................................... 21 00488

(51) Int. Cl.
| | |
|---|---|
| *B60N 2/70* | (2006.01) |
| *B60N 2/22* | (2006.01) |
| *B60N 2/68* | (2006.01) |
| *B60N 2/897* | (2018.01) |
| *B60N 2/20* | (2006.01) |

(52) U.S. Cl.
CPC ............... *B60N 2/22* (2013.01); *B60N 2/682* (2013.01); *B60N 2/70* (2013.01); *B60N 2/897* (2018.02); *B60N 2/20* (2013.01)

(58) Field of Classification Search
CPC .......... B60N 2/7035; B60N 2/58; B60N 2/70; B60N 2/5825; B60N 2/897
See application file for complete search history.

(56) References Cited

U.S. PATENT DOCUMENTS

| | | | |
|---|---|---|---|
| 9,802,535 B2 | 10/2017 | Line | |
| 9,845,032 B1 | 12/2017 | Line | |
| 10,081,282 B2 * | 9/2018 | Line | B60N 2/72 |
| 10,220,733 B2 * | 3/2019 | Matsushima | B60N 2/64 |
| 10,427,570 B2 * | 10/2019 | Haby | B60N 2/80 |
| 2004/0183356 A1 | 9/2004 | Philippot | |
| 2016/0129818 A1 * | 5/2016 | Sahashi | B60N 2/5825 297/452.61 |
| 2017/0036577 A1 * | 2/2017 | Line | B60N 2/50 |
| 2017/0174106 A1 * | 6/2017 | Stein | B60N 2/68 |
| 2018/0022258 A1 * | 1/2018 | Matsushima | B60N 2/80 297/440.1 |
| 2018/0319301 A1 | 11/2018 | Haby | |

FOREIGN PATENT DOCUMENTS

| | | | | |
|---|---|---|---|---|
| DE | 102016107090 A1 | | 10/2016 | |
| DE | 102017125535 A1 | * | 5/2018 | ............... B60N 2/58 |
| GB | 2222520 A | * | 3/1990 | ............... B60N 2/58 |
| GB | 2524613 A | * | 9/2015 | ............... B60N 2/58 |
| JP | 2010148601 A | | 7/2010 | |
| JP | 2016097806 A | * | 5/2016 | ............. B21D 53/88 |
| KR | 20140125577 A | * | 10/2014 | |
| WO | WO-2015086765 A1 | * | 6/2015 | ........... B60N 2/5825 |
| WO | WO-2019098743 A1 | * | 5/2019 | ............... B60N 2/58 |

* cited by examiner

*Primary Examiner* — Timothy J Brindley
(74) *Attorney, Agent, or Firm* — Barnes & Thornburg LLP

(57) ABSTRACT

A backrest of a vehicle seat comprises a backrest frame, at least one headrest attachment rod, and a backrest upholstery. The backrest upholstery comprises at least one rear central shell, fixed to a rear face of the backrest frame. The rear central shell comprises at least one hole traversed by the at least one headrest attachment rod.

21 Claims, 10 Drawing Sheets

VEHICLE SEAT BACKREST

PRIORITY CLAIM

Figure 1:
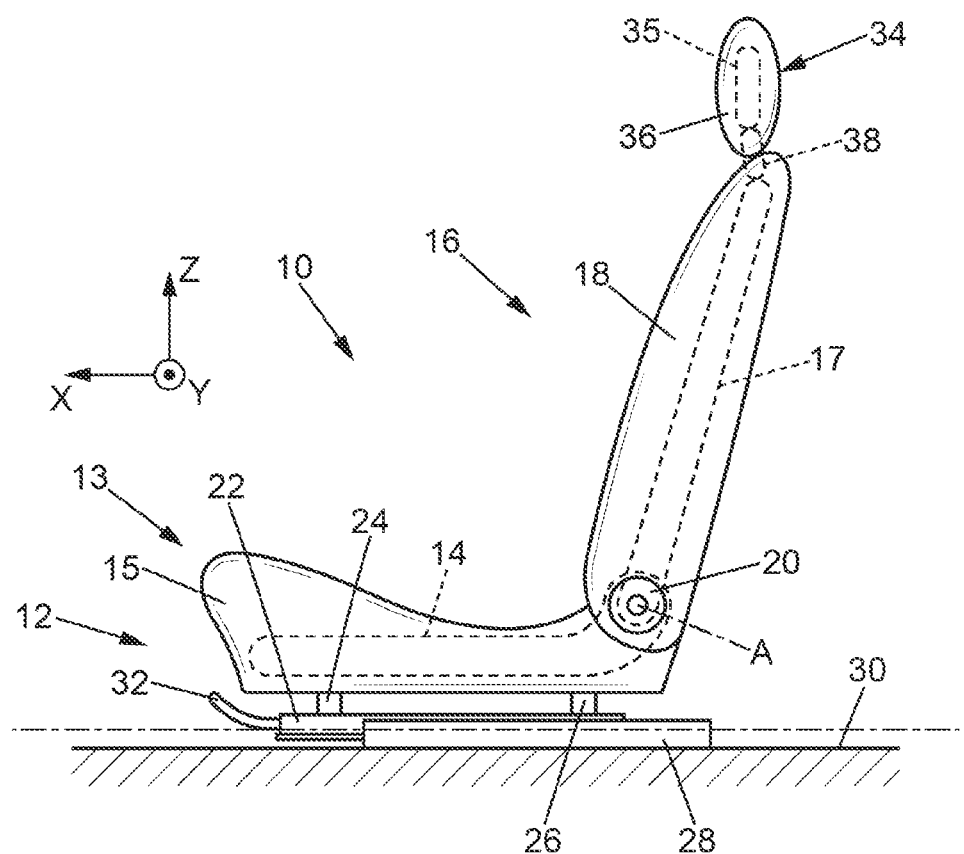

This application claims priority to French Patent Application No. FR2100488, filed Jan. 19, 2021, which is expressly incorporated by reference herein.

BACKGROUND

The present disclosure relates to a vehicle seat backrest, in particular of a motor vehicle. Also described is a vehicle seat comprising such a backrest, and a method of manufacturing such a vehicle seat backrest.

SUMMARY

According to the present disclosure, a vehicle seat backrest comprises a backrest frame, at least one headrest attachment rod, and a backrest upholstery.

In illustrative embodiments, the backrest upholstery comprises at least one rear central shell, fixed to a rear face of the backrest frame, the rear central shell comprising at least one hole traversed by the at least one headrest attachment rod.

In illustrative embodiments, the hole in the rear central shell helps to guide the positioning of this rear central shell on the backrest frame. It is thus possible to obtain a very precise positioning of the rear central shell, even with the help of automated systems.

In illustrative embodiments, a method of assembly comprises one or more of the following features, alone or in combination:
  the at least one hole is formed on an upper rim of the rear central shell;
  the rear central shell comprises a hole, preferably two holes, each hole being traversed by a single respective headrest attachment rod;
  the backrest upholstery comprises at least two rear side shells, the rear side shells preferably being fixed to the rear central shell, in particular by snap fitting (also referred to as elastic interlocking);
  the backrest upholstery also comprises a front central upholstery module, comprising at least one backrest padding, the front central upholstery module being fixed to a front face of the backrest frame;
  the front central upholstery module comprises at least one hole traversed by the at least one headrest attachment rod, the front central upholstery module preferably partially covering the rear central shell in the vicinity of the at least one headrest attachment rod;
  the backrest frame comprises at least one upper crossmember, integral with the at least one headrest attachment rod, and a lower crossmember, the front central upholstery module comprising fixing means for attachment to the upper crossmember and/or to the lower crossmember, in particular snap fitting fixing means;
  the front central padding module comprises a support for the padding, the padding being for example overmolded on the support;
  the backrest upholstery comprises at least two front side upholstery modules, the at least two front side upholstery modules each comprising a support fixed to the backrest frame and a padding fixed to the respective support, the rear central shell preferably being fixed to the supports of the front side upholstery modules, in particular by snap fitting; and
  the rear side shells are further fixed to the supports of the front side upholstery modules, in particular by snap fitting.

In illustrative embodiments, also described is a vehicle seat backrest assembly comprising a backrest as described above, in all its combinations, and a headrest, the headrest comprising a headrest frame and a headrest upholstery, the headrest frame being fixed to the at least one headrest attachment rod.

In illustrative embodiments, a motor vehicle seat is also described comprising a seating portion with a seating portion frame and a backrest as described above, in all its combinations, in particular in a seat backrest assembly as described above, in all its combinations, the backrest frame being fixed to the seating portion frame, preferably so as to be able to pivot about a transverse axis.

In illustrative embodiments, a method of manufacturing a seat backrest as described above in all its combinations is also described, comprising the steps of:
  i) providing a backrest frame to which is fixed at least one headrest attachment rod;
  ii) providing a rear central shell comprising at least one hole suitable for receiving the at least one headrest attachment rod;
  iii) positioning the rear central shell on the backrest frame so that the at least one headrest attachment rod is received in the at least one hole; and
  iv) fixing the rear central shell, in particular by snap fitting.

In illustrative embodiments, the method of manufacturing a seat backrest may further comprise a step
  a) of providing two side upholstery modules and fixing the side upholstery modules on the backrest frame, step a) preferably being before step iii), the rear central shell more preferably being fixed to the side upholstery modules.

Additionally or alternatively, the method of manufacturing a seat backrest may comprise a step b) of providing two rear side shells and fixing the rear side shells, step b) preferably being subsequent to step iv) and to step a) where appropriate, the rear side shells preferably further being fixed to the side upholstery modules, where appropriate.

Additionally or alternatively, the method of manufacturing a vehicle seat backrest may comprise a step c) of providing a front central upholstery module and fixing the front central upholstery module on the backrest frame, preferably by snap fitting, step c) more preferably being subsequent to steps iv), a) and/or b), where appropriate.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
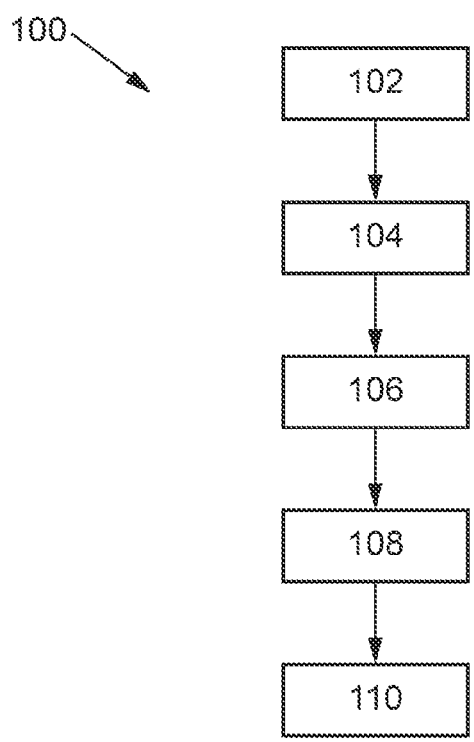
Figure 3A:
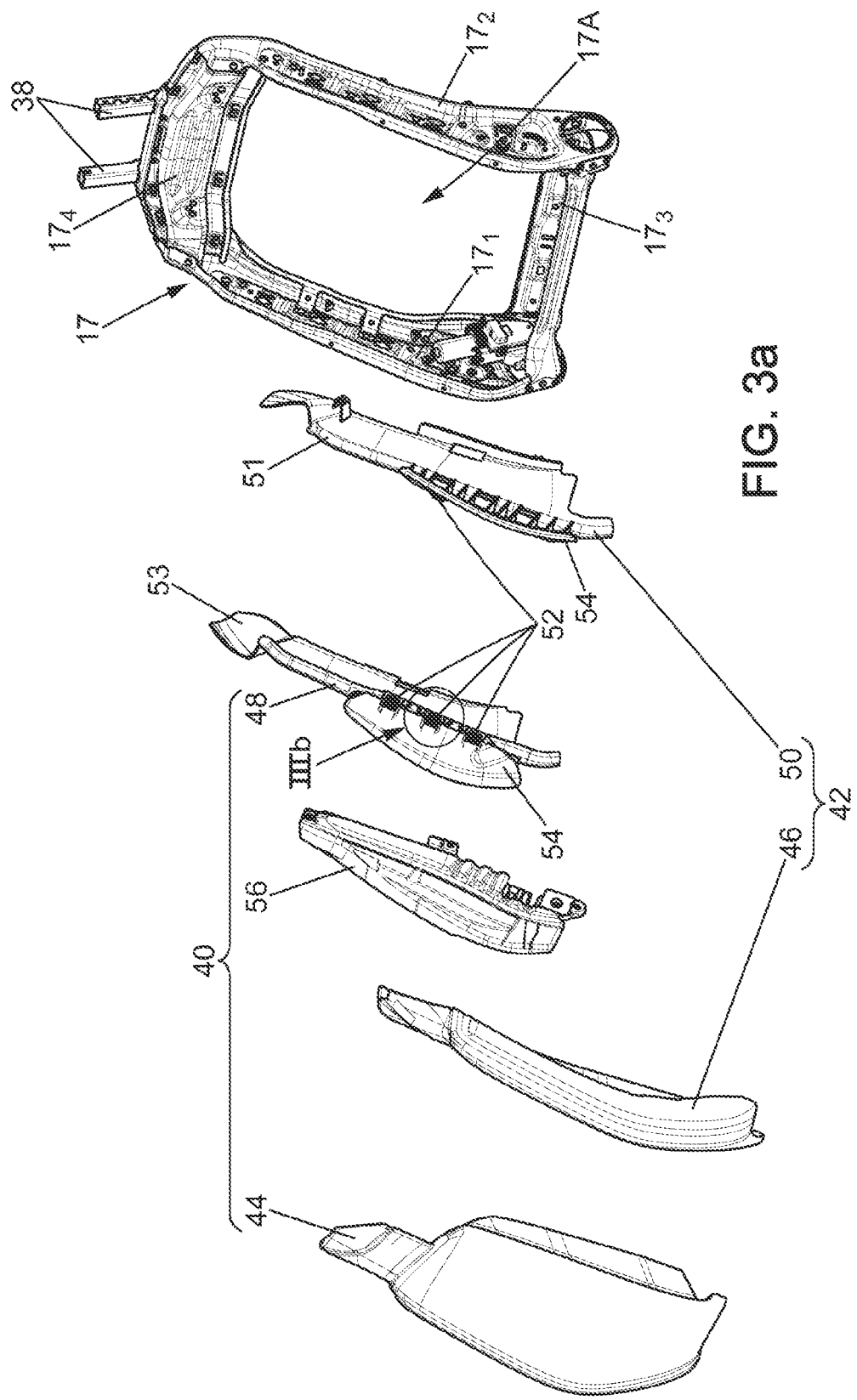
Figure 3B:
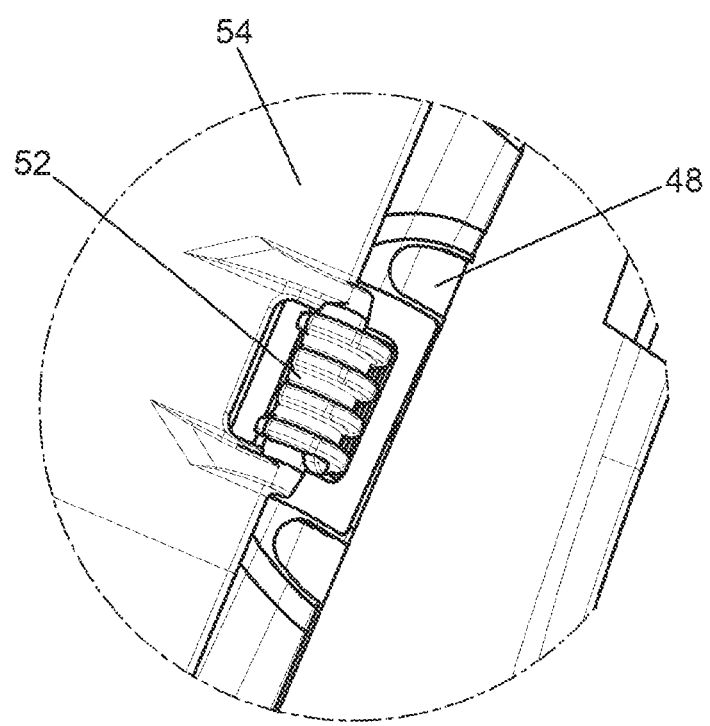
Figure 4:
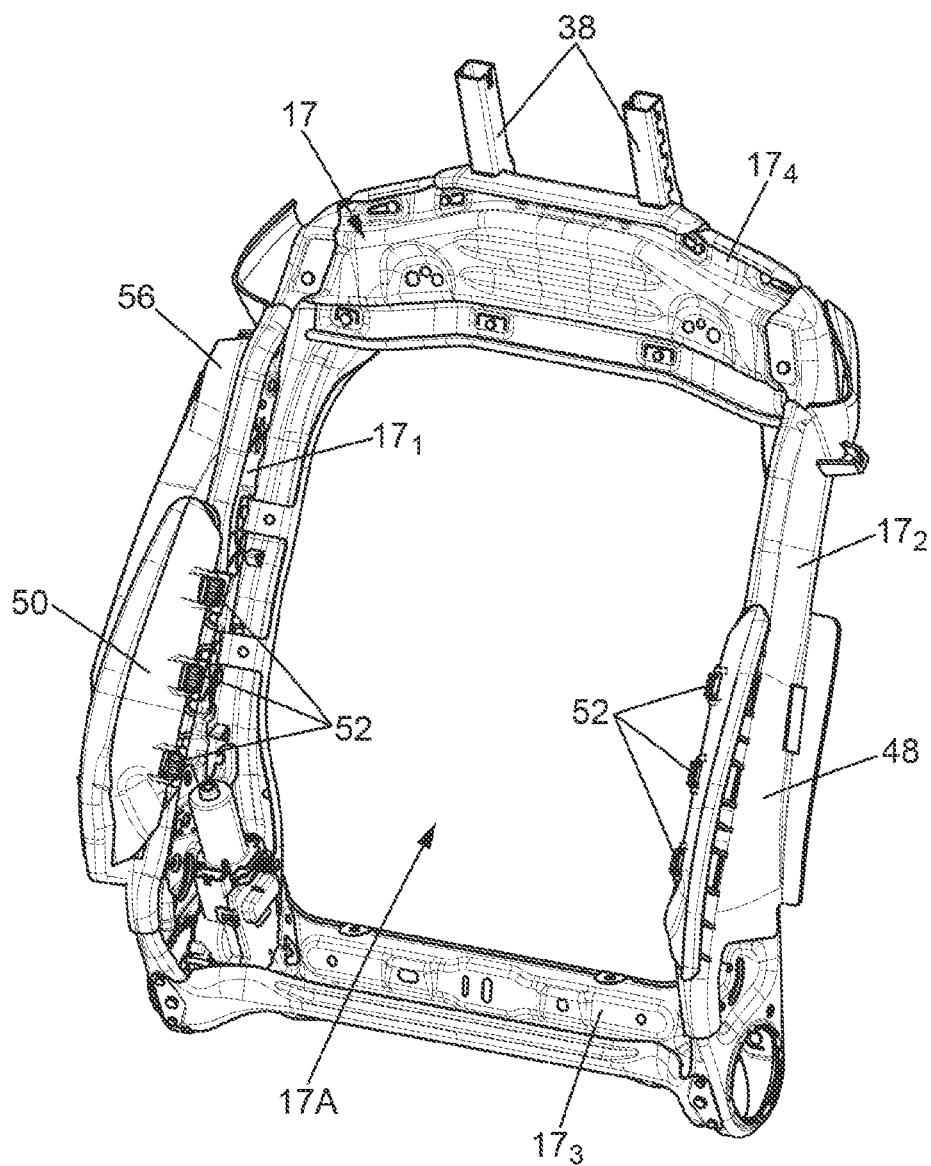
Figure 5:
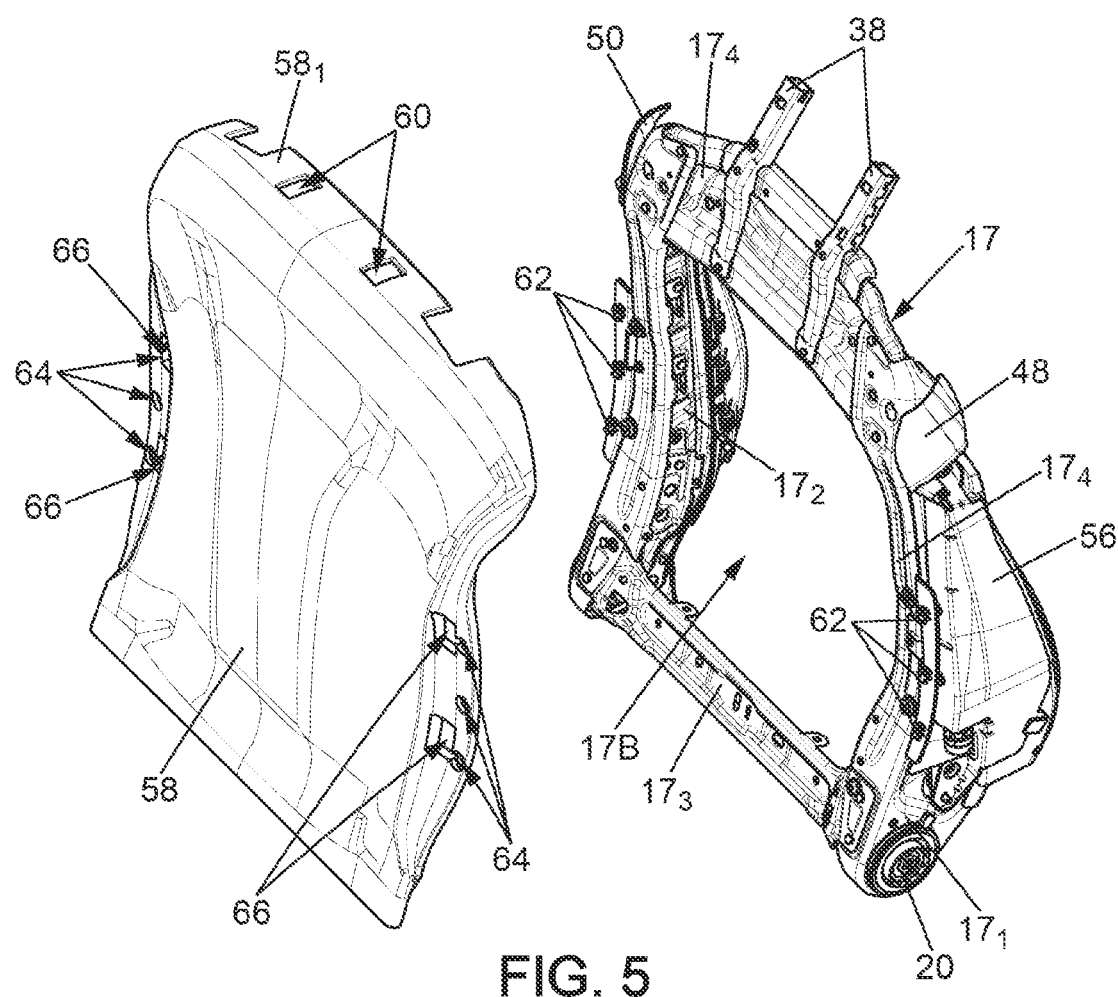
Figure 6:
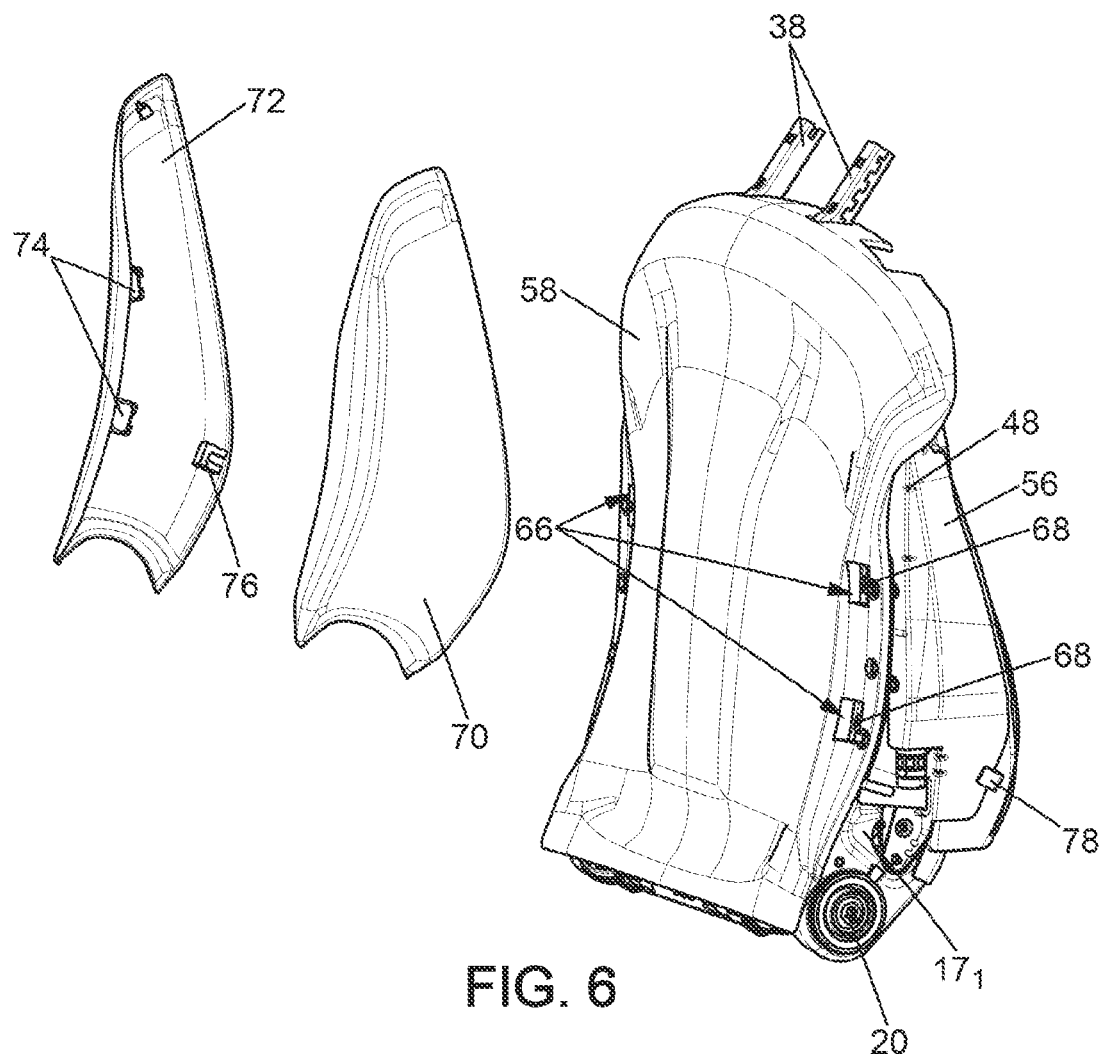
Figure 7:
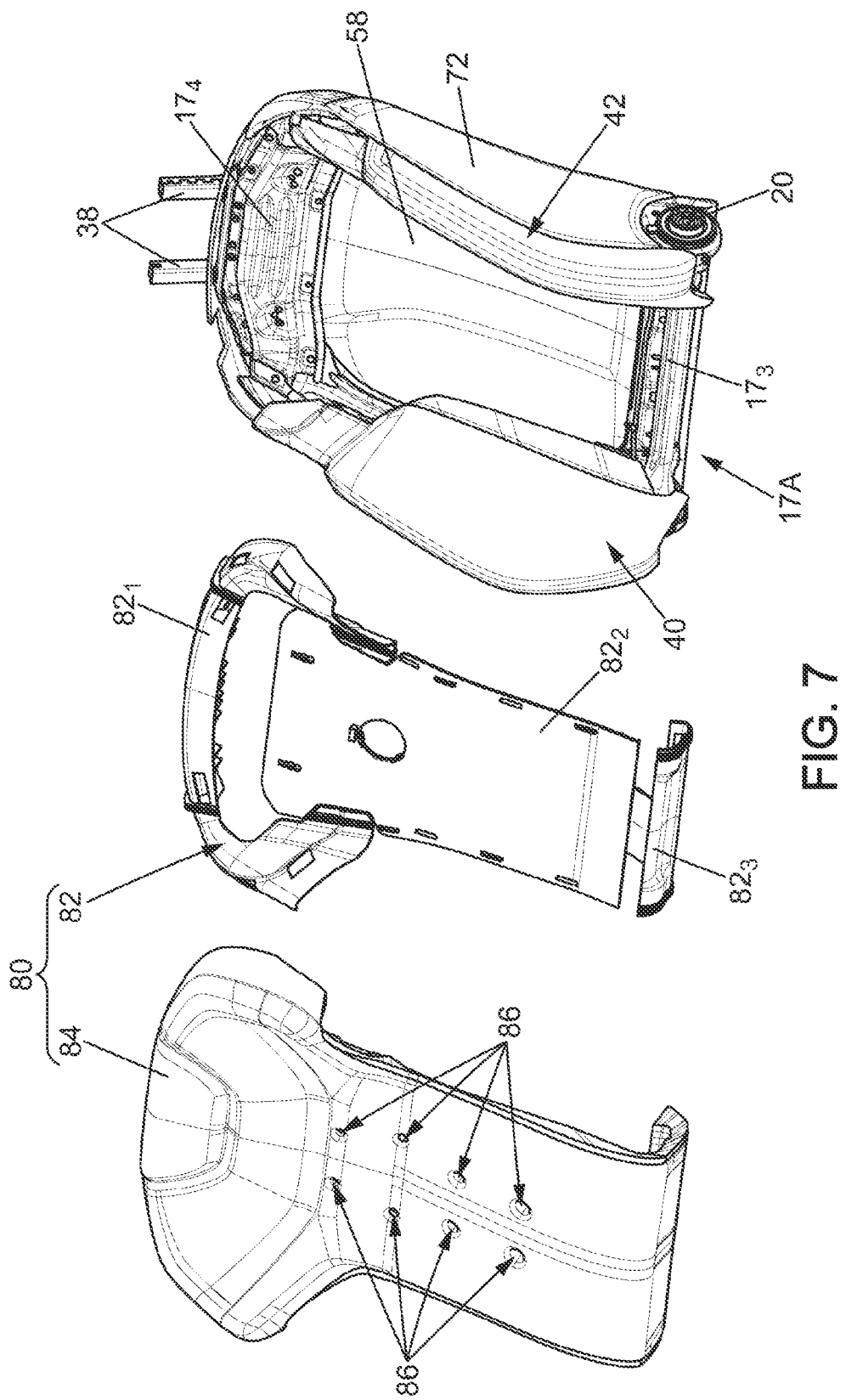
Figure 8:
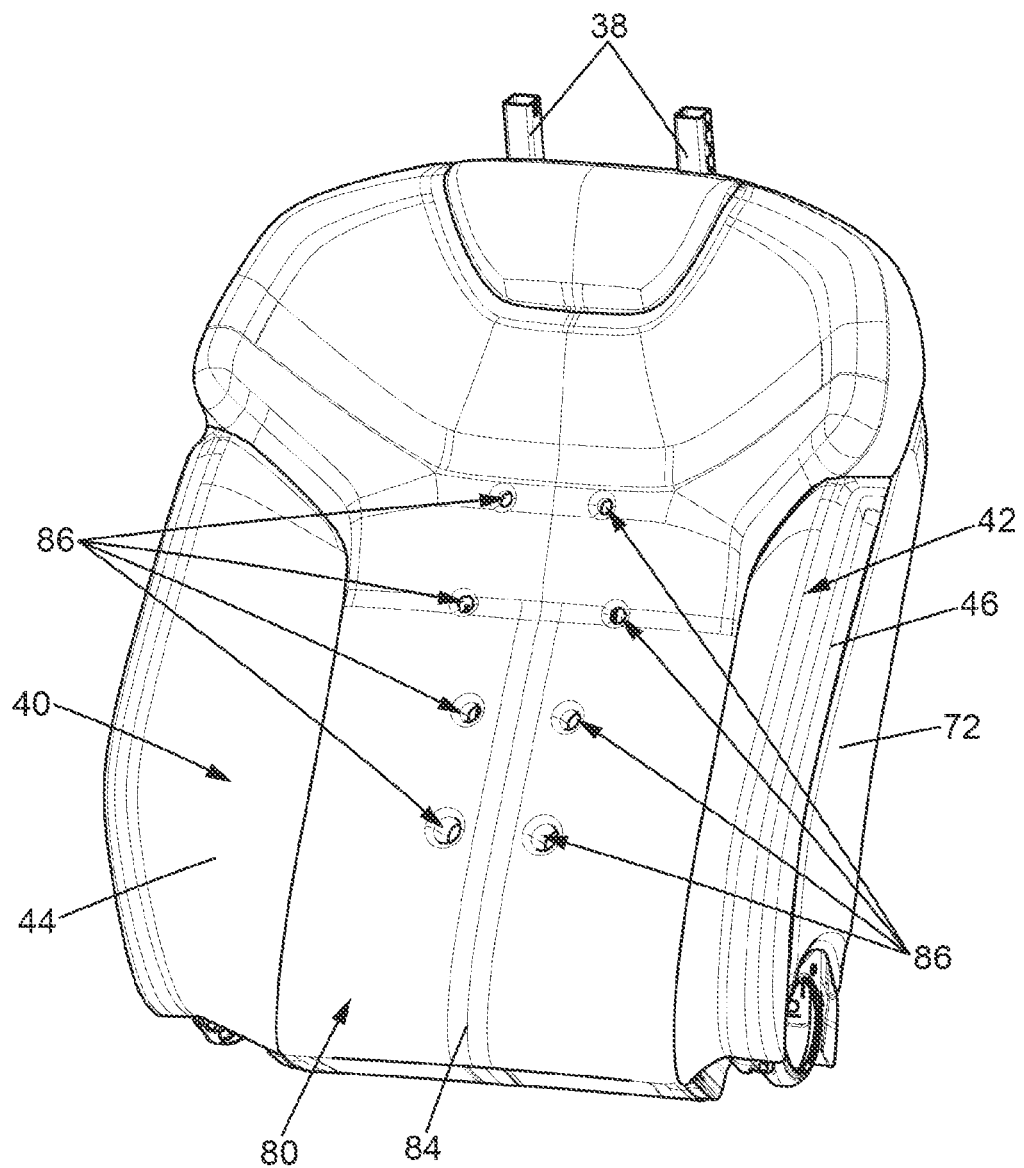
Figure 9:
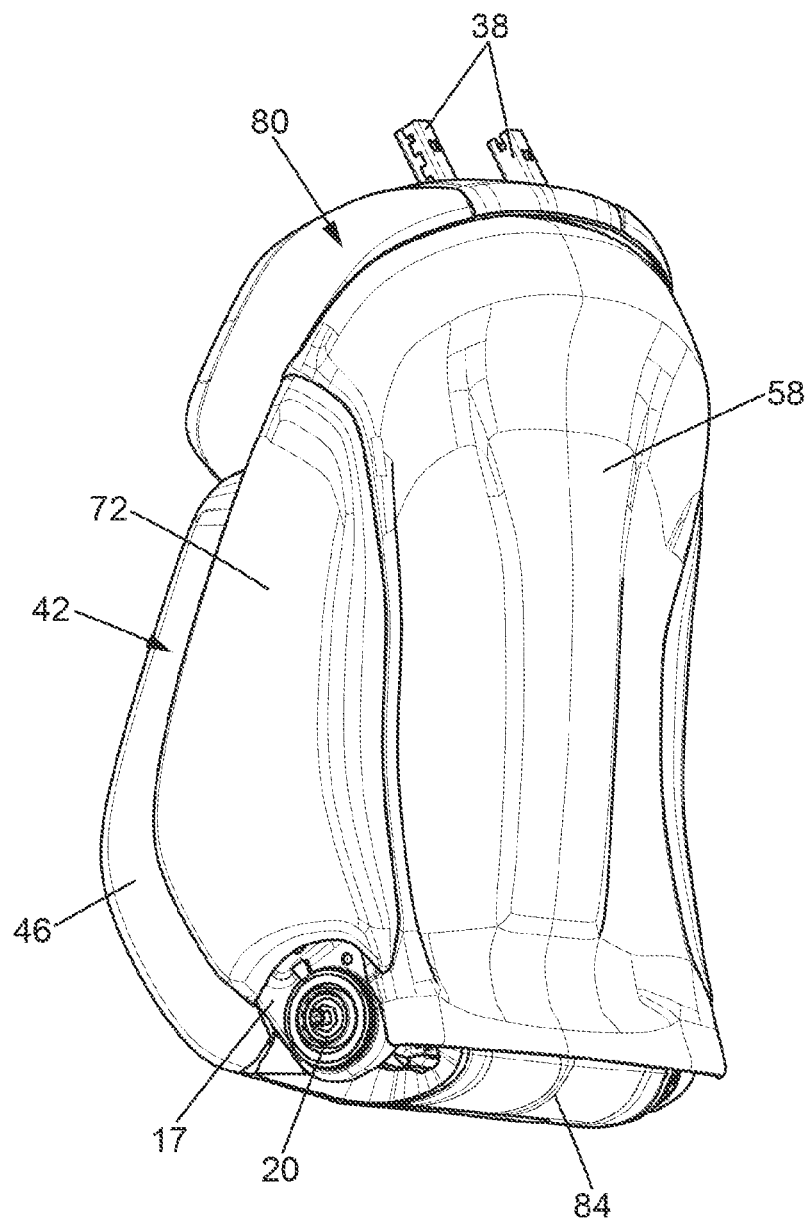

The detailed description particularly refers to the accompanying figures in which:
  FIG. 1 schematically shows an example of a vehicle seat in a section view;
  FIG. 2 is a flowchart of an exemplary method of manufacturing the vehicle seat backrest of FIG. 1;
  FIG. 3a schematically illustrates a first step of the method of FIG. 2;
  FIG. 3b schematically illustrates a detail of FIG. 3a;
  FIG. 4 schematically shows a perspective view of the front face of the seat backrest blank at the end of the step of FIG. 3a;

FIG. 5 schematically illustrates a second step of the method of FIG. 2;

FIG. 6 schematically illustrates a third step of the method of FIG. 2;

FIG. 7 schematically illustrates a fourth step of the method of FIG. 2;

FIG. 8 shows a perspective view of a front face of the seat backrest obtained at the end of the step illustrated in FIG. 7; and FIG. 9 shows a perspective view of a rear face of the seat backrest obtained at the end of the step illustrated in FIG. 7.

DETAILED DESCRIPTION

In the various figures, the same references designate identical or similar elements. For brevity, only those elements which are useful to understanding the embodiment described are shown in the figures and described in detail below.

In the following description, when reference is made to absolute position qualifiers, such as the terms "front", "rear", "top", "bottom", "left", "right", etc., or relative qualifiers, such as the terms "above", "below", "upper", "lower", etc., or to orientation qualifiers, such as "horizontal", "vertical", etc., unless otherwise specified, these are in reference to the orientation of the figures or of a vehicle seat in its normal position of use.

In particular, the longitudinal direction X refers to the longitudinal direction of the seat. The longitudinal direction of the seat is considered to be the same as the longitudinal direction of the motor vehicle in which the seat is mounted. This longitudinal direction X corresponds to the normal direction of travel of the vehicle. The longitudinal direction X is horizontal. The transverse direction Y of the seat thus corresponds to the transverse or lateral direction of the motor vehicle. This transverse direction corresponds to a direction perpendicular to the normal direction of travel of the vehicle. The transverse direction Y is horizontal. Finally, the vertical direction Z is a vertical direction of the seat, perpendicular to the longitudinal and transverse directions.

FIG. 1 schematically shows a motor vehicle seat 10 mounted on a slide mechanism 12.

The seat 10 includes a seating portion 13, with a seating portion frame 14 and seating portion upholstery 15, on which is mounted a backrest 16, with a backrest frame 17 and backrest upholstery 18. Here the backrest frame 17 pivots about an axis A, relative to the seating portion frame 14. To do so, a hinge mechanism 20 is arranged between the seating portion frame 14 and the backrest frame 17. The axis A is for example substantially parallel to the transverse direction Y.

The seating portion 13 is mounted on movable profiles 22, also called sliders or male profiles, by means of feet 24, 26. Each movable profile 22 is part of a slide 12 and is associated with a fixed profile 28. The fixed profile 28 is also called a rail or female profile. The fixed profile 28 is fixed to the floor 30 of a motor vehicle.

In this example, the seat 10 comprises a manual control member 32, called a lever, for controlling the sliding of the slides 12. This manual control member 32 makes it possible in particular to lock and unlock the stop systems which prevent the sliding of the movable profiles 22 relative to the respective fixed profiles 28. Once the stop systems are released, the manual control member 32 can also be used to slide the movable profiles 22 relative to their respective fixed profiles 28 of the slide 12 along the longitudinal direction X of the slides 12. The fixed 28 and movable profiles 22 of the slides 12 may be of metal.

Alternatively, the movement of the movable profiles 22 relative to the fixed profiles 28 is controlled by means of an actuator. One or more actuator control buttons may then be provided on the seat 10, in particular on the seating portion 13.

The seat 10 further comprises a headrest 34. The headrest 34 comprises a headrest frame 35 and a headrest upholstery 36. The headrest frame 35 is connected to the backrest frame 17 by means of at least one headrest attachment rod 38, preferably two headrest attachment rods 38. The headrest attachment rod(s) 38 may be of variable length to allow adjusting the positional height of the headrest 34. Additionally or alternatively, the headrest frame 35 is movable relative to the headrest attachment rod(s) 35 to allow this adjusting of the positional height of the headrest 34. The headrest upholstery 36 and/or the backrest upholstery 18 may cover all or part of the headrest attachment rod(s) 38, for example to improve the aesthetics of the vehicle seat 10.

In the following, the backrest 16 of the vehicle seat 10 and its method of manufacturing 100 illustrated in FIG. 2 will be described in more detail.

As illustrated in FIG. 2, the method 100 comprises a first step 102 of providing a backrest frame 17. As illustrated in FIG. 3a, the backrest frame 17 comprises a first upright $17_1$, a second upright $17_2$, a first crossmember $17_3$, hereinafter called "lower crossmember $17_3$", and a second crossmember $17_4$, hereinafter called "upper cross member $17_4$". The uprights $17_1$, $17_2$ and the crossmembers $17_3$, $17_4$ form a backrest frame 17 in the form of a framework. To achieve this, the uprights $17_1$, $17_2$, and the crossmembers $17_3$, $17_4$ can be fixed together, in particular welded together. Alternatively, the backrest frame 17 is one piece, being for example molded.

Here, the headrest attachment rods 38 are already fixed on the upper crossmember $17_4$ of the backrest frame 17 at this first step 102. Alternatively, however, these headrest attachment rods 38 may be attached to the upper crossmember $17_4$ of the backrest frame 17 in a later step.

During a second step 104 of the manufacturing method 100, a first side upholstery module 40 and a second side module upholstery 42 are fixed to the front face 17A of the backrest frame 17, visible in FIG. 3a, on a respective upright $17_1$, $17_2$ of the backrest frame 17. Thus, a side upholstery module 40, 42 is arranged on each side of the backrest frame 17. The front face 17A of the backrest frame 17 is the face of the backrest frame 17 intended to be oriented towards an occupant of the vehicle seat 10. The rear face 17B of the backrest frame 17 is the face opposite to the front face 17A.

Each side upholstery module 40, 42 here comprises padding in the form of a foam block 44, 46, each foam block 44, 46 being fixed on a respective support 48, 50. For example, each foam block 44, 46 is overmolded on the respective support 48, 50. Each support 48, 50 may be fixed to the respective upright $17_1$, $17_2$ of the backrest frame 17 by snap fitting and/or welding and/or screwing and/or riveting and/or forcibly inserting a contoured relief into a complementary relief, in particular. Here, each support 48, 50 comprises a respective upright 51, 53 with snap fitting reliefs 52 making it possible to fix on the upright 51, 53, here by snap fitting, an airbag support 54 to which an airbag is fixed. Each airbag is connected to a pump for inflation. The airbags thus improve the lateral support for the occupant of the vehicle seat 10. In the example illustrated, each snap fitting relief 52 takes the form of a U-shaped hook, into which is snap fitted a rod formed by the inflatable cushion support 54. Other shapes of the snap fitting reliefs 52 are accessible to those skilled in the art.

The first side upholstery module 40 intended to be positioned centermost in the motor vehicle equipped with the seat 10, here further comprises a side airbag safety device 56. Such an airbag device 56 aims to avoid direct head-to-head impacts between the occupants of two seats arranged transversely, one next to the other. The airbag system 56 is at least partially covered by the foam block 44 of the first side upholstery module 40.

The method of manufacturing 100 then continues with a step 106 of fixing a rear central shell 58 on the backrest frame 17. The rear central shell 58 makes it possible to obtain a very aesthetic backrest of the seat 10. The rear central shell can be without foam, since it is not intended to provide support for an occupant of the vehicle seat 10.

Here, it is noteworthy that an upper rim $58_1$ of the rear central shell 58 has two holes 60 each suitable for receiving one of the respective headrest attachment rods 38. It is thus possible to install the rear central shell 58 on the backrest frame 17, guiding this installation by the receiving of the headrest attachment rods 38 in the openings 60. The installation of the rear central shell 58 is greatly facilitated. Such an implementation can thus be carried out in an efficient manner by means of an automated system. The fixing of the rear central shell 58 is then carried out, in the example illustrated, by snap fitting of second snap fitting reliefs 62 of the supports 48, 50 of the side upholstery modules 40, 42, with additional reliefs 64 of the rear central shell 58. Here, the second snap fitting reliefs 62 take the form of deformable studs having a bead at the end, each received in a respective opening 64 in the rear central shell 58, of smaller diameter than the diameter of the bead of the studs. Here again, this fixing, achieved by moving the rear central shell 58 relative to the backrest frame 17, can be achieved by means of one or more automated systems.

The fixing of the rear central shell 58 may however be carried out in an alternative or complementary manner, using any fixing means accessible to those skilled in the art, in particular by screwing, welding, riveting, or forcibly inserting a fixing relief in a complementary relief. Such fixing means may also be implemented by means of one or more automated systems.

Also, in the example described, the rear central shell 58 is fixed to the side upholstery modules 40, 42. Additionally or alternatively, the rear central shell 58 is fixed directly to the backrest frame 17, in particular to the uprights $17_1$, $17_2$ and/or to the lower crossmember $17_3$.

It can be noted here that the rear central shell 58 has openings 66, distinct from the holes 60, allowing free access to third snap fitting reliefs 68 of the side upholstery modules 40, 42, in particular the supports 48, 50 of the side upholstery modules 40, 42.

The method of manufacturing 100 then continues with a step 108 of fixing the rear side shells 70, 72, here so as to cover at least part of the lateral ends of the rear central shell 58. To do this, each rear side shell 70, 72 comprises fixing means 74, here in the form of snap fitting reliefs complementary to the third snap fitting reliefs 68 of the supports 48, 50 of the side upholstery modules 40, 42. In addition, each rear side shell 70, 74 may include a relief 76 intended to be received in a complementary housing 78 of the corresponding side upholstery module 40, 42, to facilitate the placement and fixing of the rear side shells 70, 72.

Here again, the rear side shells 70, 72 serve an aesthetic function, particularly in that they conceal the fixing means for the rear central shell 58. As these rear side shells 70, 72 are not intended to serve as a support for an occupant of the vehicle seat, they may also be without padding, in particular foam.

The method of manufacturing 100 then continues with a final step 110 of fixing a front central upholstery module 80.

As illustrated in FIG. 7, the front central upholstery module 80 comprises a support 82 and padding, here in the form of a foam block 84, fixed on the support 82. The foam block 84 may in particular be overmolded on the support 82.

The support 82 of the front central upholstery module 80 may comprise at least three parts assembled together to form an upper part $82_1$, a middle part $82_2$, and a lower part $82_3$ of the support 82.

The upper part $82_1$ may be shaped to facilitate the installation of the central upholstery module 80 on the backrest frame 17. To do so, the upper part $82_1$ and the foam block 84 may have openings (not visible in the figures) suitable for receiving the headrest attachment rod(s) 38. Thus, this upper part $82_1$ is placed above the rear central shell 58, in the vicinity of the headrest attachment rods 38. The central upholstery module 80 thus at least partially covers, preferably completely covers, the rim $58_1$ of the rear central shell 58. To achieve this, the upper end of the front central upholstery module 80 may be curved.

The middle part $82_2$ has the function of supporting the foam block 84, where the occupant of the vehicle seat 10 primarily bears against the seat backrest 16. The middle part $82_2$ thus advantageously provides sufficient mechanical resistance so that the foam block 84 does not sink in completely when an occupant of the vehicle seat 10 leans on the seat backrest 16. However, the middle part $82_2$ is advantageously still relatively flexible in order to ensure the comfort of the occupant of the vehicle seat 10.

In addition, the middle part $82_2$ can support one or more members making it possible to fulfill one or more comfort and/or safety functions for the occupant of the seat 10. For example, a fan may be attached to this central part, suitable for blowing air towards the occupant of the seat, through openings 86 in the central upholstery module 80.

The middle part $82_2$ can have different forms. Here, the middle part $82_2$ is in the form of a flexible plate, in particular more flexible than the upper part $82_1$ and/or the lower part $82_3$. Alternatively, the middle part $82_2$ is composed of spring wires extending between the upper part $82_1$ and the lower part $82_3$, to ensure that the foam block 84 is held in position, with elastic support for this foam block 84.

Finally, the lower part $82_3$ is shaped here to ensure the attachment of the central front upholstery module 80, in this case on the backrest frame 17. Here, this lower part $82_3$ is curved at its lower end and has snap fitting reliefs (not shown in the figures) suitable for engaging with complementary reliefs on the lower crossmember $17_3$ of the backrest frame 17. As can be seen in particular in FIG. 9, once the central front upholstery module 80 is attached to the backrest frame 17, the foam block 84 extends locally under the rear central shell 58. In other words, part of the foam block 84 of the central upholstery module 80 extends between the backrest frame 17, in particular the lower crossmember $17_3$, and the rear central shell 58. A very aesthetic finish is thus obtained for the backrest upholstery 18. In particular, the fixing means for all of the elements forming the backrest upholstery 18 are concealed.

However, other fixing means for attaching the central upholstery module 80 on the backrest frame 17 are conceivable, in particular such as screwing, welding, riveting, or forcibly inserting a fixing relief into a complementary relief.

Additionally or alternatively, the central upholstery module 80 may be fixed to the rear central shell 58 and/or to the side upholstery modules 40, 42 or even to the rear side shells 70, 72.

It should be noted that the elements forming the backrest upholstery 18 may be fixed successively, in particular by means of automated systems. As such, production of the upholstery solely by means of upholstery modules and shell modules allows easy manipulation, in particular by automated systems.

A headrest 34 may lastly be fixed on the headrest attachment rods 38. Advantageously, the headrest upholstery 36 covers the headrest attachment rod(s) 38, such that the backrest 18 and the headrest 34 assembly thus obtained is particularly aesthetic.

The present disclosure is not limited solely to the examples described above. On the contrary, the present disclosure is capable of numerous variations accessible to those skilled in the art.

Thus, in the example illustrated, the front part of the backrest upholstery 18 is produced by means of modules 40, 42, 80. As indicated above, such production by means of modules 40, 42, 80 makes it possible to automate easily the manufacture of the backrest 16 while obtaining a highly aesthetic appearance of the backrest 16. Alternatively, however, the backrest upholstery 18, in particular its front part intended to be in contact with an occupant of the vehicle seat 10, may be implemented in another form, in particular as a single unit without separate modules.

Also, each upholstery module 40, 42, 80 may comprise a cover covering all or part of the respective foam block 44, 46, 84. The cover may in particular be placed in the mold used for overmolding the foam block 44, 46, 84 on the respective support 48, 50, 82. The cover then adheres to the foam block 44, 46, 84. Alternatively, the cover may be fixed to the foam block 44, 46, 84 and/or to the support 48, 50, 82 after the foam block 44, 46, 84 has been formed. In other words, the cover may be attached onto the foam block 44, 46, 84 and/or onto the support 48, 50, 82. The cover is then fixed by any means accessible to those skilled in the art.

According to yet another variant, a single cover is used to cover the three foam blocks 44, 46, 84 of the upholstery modules 40, 42, 80. Here again, in this case, the cover is advantageously attached onto the foam blocks 44, 46, 84 and/or onto the respective supports 48, 50, 82 of the upholstery modules 40, 42, 80, or even onto the backrest frame 17 and/or the rear central shell 58. Here again, the cover is fixed by any means accessible to those skilled in the art.

Advantageously, the upholstery of each upholstery module 40, 42, 80 is independent of the other two, as described above. Alternatively, however, it is conceivable that a foam block, for example, is common to several upholstery modules, in particular to all of the upholstery modules 40, 42, 80.

It can be noted that here the side upholstery modules 40, 42 pre-exist their attachment to the backrest frame 17. Thus, these side upholstery modules 40, 42 are not produced by overmolding the backrest frame 17 and/or structural elements already integral with the backrest frame 17. This does not prevent the foam blocks 44, 46, 84 of the various upholstery modules 40, 42, 80 from being produced by overmolding a possible support of the respective upholstery module 48, 50, 82. However, such overmolding is carried out prior to fixing the support in question to the backrest frame 17.

A backrest (16) of a vehicle seat (10) comprises a backrest frame (17), at least one headrest attachment rod (38), and a backrest upholstery (18). The backrest upholstery (18) comprises at least one rear central shell (58), fixed to a rear face (17B) of the backrest frame (17). The rear central shell (58) comprises at least one hole (60) traversed by the at least one headrest attachment rod (38).

A comparative vehicle seat backrest may be produced fixing upholstery on a backrest frame. The backrest frame provides for a rigid backrest, while the upholstery provides for comfort and aesthetics of the backrest.

The comparative upholstery comprises a padding covered with one or more covers to protect the padding and/or to hold it in position on the backrest of the seat.

However, such a comparative backrest is difficult to produce using automated systems. In particular, the precise placement of the padding can be difficult.

It has been proposed to implement the rear part of the upholstery by means of a shell without padding. Indeed, padding on the rear part of the backrest appears unnecessary since this rear part does not serve as a support for a seat occupant.

However, such a shell is also difficult to manipulate, position precisely, and fix on the backrest frame, by means of automated systems.

This disclosure aims to improve the situation.

To this end, a vehicle seat backrest is described comprising a backrest frame, at least one headrest attachment rod, and a backrest upholstery, the backrest upholstery comprising at least one rear central shell, fixed to a rear face of the backrest frame, the rear central shell comprising at least one hole traversed by the at least one headrest attachment rod.

Thus, advantageously, the hole in the rear central shell helps to guide the positioning of this rear central shell on the backrest frame. It is thus possible to obtain a very precise positioning of the rear central shell, even with the help of automated systems.

According to preferred embodiments, the method of assembly comprises one or more of the following features, alone or in combination:

- the at least one hole is formed on an upper rim of the rear central shell;
- the rear central shell comprises a hole, preferably two holes, each hole being traversed by a single respective headrest attachment rod;
- the backrest upholstery comprises at least two rear side shells, the rear side shells preferably being fixed to the rear central shell, in particular by snap fitting (also referred to as elastic interlocking);
- the backrest upholstery also comprises a front central upholstery module, comprising at least one backrest padding, the front central upholstery module being fixed to a front face of the backrest frame;
- the front central upholstery module comprises at least one hole traversed by the at least one headrest attachment rod, the front central upholstery module preferably partially covering the rear central shell in the vicinity of the at least one headrest attachment rod;
- the backrest frame comprises at least one upper crossmember, integral with the at least one headrest attachment rod, and a lower crossmember, the front central upholstery module comprising fixing means for attachment to the upper crossmember and/or to the lower crossmember, in particular snap fitting fixing means;
- the front central padding module comprises a support for the padding, the padding being for example overmolded on the support;
- the backrest upholstery comprises at least two front side upholstery modules, the at least two front side upholstery modules each comprising a support fixed to the backrest frame and a padding fixed to the respective support, the rear central shell preferably being fixed to the supports of the front side upholstery modules, in particular by snap fitting; and the rear side shells are further fixed to the supports of the front side upholstery modules, in particular by snap fitting.

According to another aspect, also described is a vehicle seat backrest assembly comprising a backrest as described above, in all its combinations, and a headrest, the headrest comprising a headrest frame and a headrest upholstery, the headrest frame being fixed to the at least one headrest attachment rod.

A motor vehicle seat is also described comprising a seating portion with a seating portion frame and a backrest as described above, in all its combinations, in particular in a seat backrest assembly as described above, in all its combinations, the backrest frame being fixed to the seating portion frame, preferably so as to be able to pivot about a transverse axis.

A method of manufacturing a seat backrest as described above in all its combinations is also described, comprising the steps of:
i) providing a backrest frame to which is fixed at least one headrest attachment rod;
ii) providing a rear central shell comprising at least one hole suitable for receiving the at least one headrest attachment rod;
iii) positioning the rear central shell on the backrest frame so that the at least one headrest attachment rod is received in the at least one hole; and
iv) fixing the rear central shell, in particular by snap fitting.

The method of manufacturing a seat backrest may further comprise a step a) of providing two side upholstery modules and fixing the side upholstery modules on the backrest frame, step a) preferably being before step iii), the rear central shell more preferably being fixed to the side upholstery modules.

Additionally or alternatively, the method of manufacturing a seat backrest may comprise a step b) of providing two rear side shells and fixing the rear side shells, step b) preferably being subsequent to step iv) and to step a) where appropriate, the rear side shells preferably further being fixed to the side upholstery modules, where appropriate.

Additionally or alternatively, the method of manufacturing a vehicle seat backrest may comprise a step c) of providing a front central upholstery module and fixing the front central upholstery module on the backrest frame, preferably by snap fitting, step c) more preferably being subsequent to steps iv), a) and/or b), where appropriate.

The invention claimed is:

1. A backrest of a vehicle seat, the backrest comprising a backrest frame,
at least one headrest attachment rod, the at least one headrest attachment rod being integral with the backrest frame, and
a backrest upholstery, the backrest upholstery comprising at least one rear central shell, fixed to a rear face of the backrest frame, the rear central shell comprising at least one hole traversed by the at least one headrest attachment rod.

2. The backrest of claim 1, wherein the at least one hole is formed on an upper rim of the rear central shell.

3. The backrest of claim 1, wherein the rear central shell comprises one hole, the one hole being traversed by a single headrest attachment rod.

4. The backrest of claim 1, wherein the rear central shell comprises two holes, each of the two holes being traversed by a single respective headrest attachment rod.

5. The backrest of claim 1, wherein the backrest upholstery comprises at least two rear side shells.

6. The backrest of claim 5, wherein the rear side shells are fixed to the rear central shell.

7. The backrest of claim 1, wherein the backrest upholstery also comprises a front central upholstery module comprising at least one backrest padding, the front central upholstery module being fixed to a front face of the backrest frame.

8. The backrest of claim 7, wherein the front central upholstery module comprises at least one hole traversed by the at least one headrest attachment rod.

9. The backrest of claim 8, wherein the front central upholstery module partially covers the rear central shell in the vicinity of the at least one headrest attachment rod.

10. The backrest of claim 7, wherein the backrest frame comprises at least one upper crossmember, integral with the at least one headrest attachment rod, and a lower crossmember, the front central upholstery module comprising fixing means for attachment to at least one among the upper crossmember and the lower crossmember.

11. The backrest of claim 7, wherein the front central upholstery module comprises a support for the padding.

12. The backrest of claim 1, wherein the backrest upholstery comprises at least two front side upholstery modules, the at least two front side upholstery modules each comprising a support fixed to the backrest frame and a padding fixed to the respective support.

13. The backrest of claim 12, wherein the rear central shell is fixed to the supports of the front side upholstery modules.

14. The backrest of claim 6, wherein the backrest upholstery comprises at least two front side upholstery modules, the at least two front side upholstery modules each comprising a support fixed to the backrest frame and a padding fixed to the respective support, and wherein the rear side shells are further fixed to the supports of the front side upholstery modules.

15. A vehicle seat backrest assembly, comprising the backrest according to claim 1 and a headrest, the headrest comprising a headrest frame and a headrest upholstery, the headrest frame being fixed to the at least one headrest attachment rod.

16. A motor vehicle seat comprising a seating portion with a seating portion frame and the backrest according to claim 1, the backrest frame being fixed to the seating portion frame.

17. A method of manufacturing the backrest according to claim 1, comprising the steps of:
i) providing a backrest frame, at least one headrest attachment rod being integral with the backrest frame;
ii) providing a rear central shell comprising at least one hole suitable for receiving the at least one headrest attachment rod;
iii) placing the rear central shell on the backrest frame so that the at least one headrest attachment rod is received in the at least one hole; and
iv) fixing the rear central shell.

18. The method of claim 17, further comprising a step a) of providing two side upholstery modules and fixing the side upholstery modules to the backrest frame.

19. The method of claim 17, comprising a step b) of providing two rear side shells and fixing the rear side shells.

20. The method of claim 17, comprising a step c) of providing a front central upholstery module and fixing the front central upholstery module on the backrest frame.

21. The backrest of claim 1, wherein the at least one headrest attachment rod is a socket.

\* \* \* \* \*